(12) United States Patent
Lee

(10) Patent No.: US 10,616,783 B2
(45) Date of Patent: Apr. 7, 2020

(54) DEVICE GROUPING BASED ON REPORTED CHANNEL INFORMATION AND COMMUNICATION PERFORMANCE

(71) Applicant: Samsung Electronics Co., Ltd., Gyeonggi-do (KR)

(72) Inventor: Kyu-haeng Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 256 days.

(21) Appl. No.: 15/420,747

(22) Filed: Jan. 31, 2017

(65) Prior Publication Data
US 2017/0332363 A1    Nov. 16, 2017

Related U.S. Application Data

(60) Provisional application No. 62/334,101, filed on May 10, 2016.

(30) Foreign Application Priority Data

Sep. 28, 2016 (KR) .......................... 10-2016-0124719

(51) Int. Cl.
*H04W 24/08* (2009.01)
*H04B 7/0452* (2017.01)

(52) U.S. Cl.
CPC ........... *H04W 24/08* (2013.01); *H04B 7/0452* (2013.01)

(58) Field of Classification Search
CPC .............................. H04W 24/08; H04B 7/0452
See application file for complete search history.

(56) References Cited

U.S. PATENT DOCUMENTS

2010/0041406 A1* 2/2010 Kim .................... H04B 7/0452
                                                           455/446
2012/0076179 A1   3/2012 Stacey et al.
(Continued)

FOREIGN PATENT DOCUMENTS

KR    1020130042582    4/2013
KR    1020150054669    5/2015
(Continued)

OTHER PUBLICATIONS

Baek, Seung Jun, Reducing Feedback Overhead in Opportunistic Scheduling of Wireless Networks Exploiting Overhearing.
(Continued)

*Primary Examiner* — Ian N Moore
*Assistant Examiner* — Justin T Van Roie
(74) *Attorney, Agent, or Firm* — The Farrell Law Firm, P.C.

(57) ABSTRACT

A transceiver includes a communicator connected to a plurality of electronic apparatuses which receives channel information on a channel between a first electronic apparatus and the transceiver from the first electronic apparatus selected among the plurality of electronic apparatuses, and a controller configured to select a second electronic apparatus among the plurality of electronic apparatuses based on information received from each of the plurality of electronic apparatuses when information indicating communication performance in the case in which each of the one or more electronic apparatuses is in the same group as the first electronic apparatus, is received from each of the plurality of electronic apparatuses through the communicator, group the first and second electronic apparatuses into the same group when the channel information on a channel between the second electronic apparatus and the transceiver is received
(Continued)

from the second electronic apparatus, and control the communicator to transmit data.

10 Claims, 8 Drawing Sheets

(56) References Cited

U.S. PATENT DOCUMENTS

2014/0098701 A1    4/2014  Sohn et al.
2016/0119762 A1    4/2016  Zhu et al.
2017/0310375 A1*  10/2017  Kim ..................... H04L 1/0026

FOREIGN PATENT DOCUMENTS

WO    WO 2012169745    12/2012
WO    WO-2015084094 A1 *  6/2015  ........... H04L 1/0026

OTHER PUBLICATIONS

Baek, Seung Jun, Reducing Feedback Overhead in Opportunistic Scheduling of Wireless Networks Exploiting Overhearing; KSII Transactions on Internet and Information Systems vol. 6, No. 2, Feb. 2012, Copyright 2012 KSII, pp. 593-609.

* cited by examiner

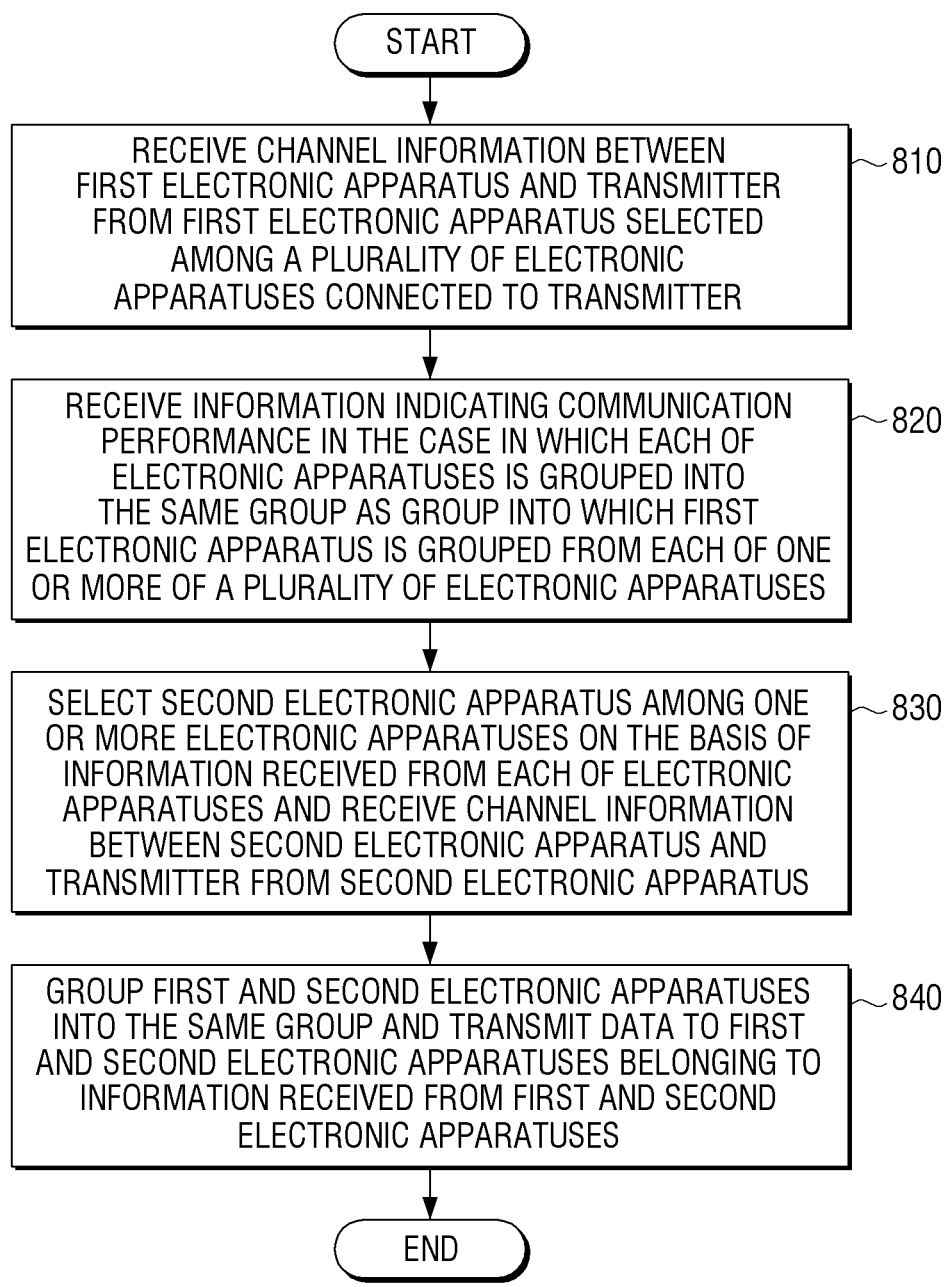

DEVICE GROUPING BASED ON REPORTED CHANNEL INFORMATION AND COMMUNICATION PERFORMANCE

PRIORITY

This application claims priority under 35 U.S.C § 119(a) to Korean Patent Application No. 10-2016-0124719, which was filed on Sep. 28, 2016, in the Korean Intellectual Property Office and U.S. Provisional Application No. 62/334,101, which was filed on May 10, 2016, in the United States Patent and Trademark Office, the entire disclosures of which are incorporated herein by reference.

BACKGROUND

1. Field of the Disclosure

The present disclosure generally relates to a transceiver and a data transmission method thereof, and more particularly, to a transceiver capable of transmitting data in a multi user multiple input multiple output (MU-MIMO) scheme, and a data transmission method thereof.

2. Description of the Related Art

One of methods for improving data transmission efficiency in a wireless communication system may be a multiple input multiple output (MIMO) technology. A MIMO scheme may be divided into a single user MIMO (SU-MIMO) scheme and a multi user MIMO (MU-MIMO) scheme depending on whether data may be simultaneously transmitted using the same frequency band when the data is transmitted to several users. It has been known that the MU-MIMO scheme capable of simultaneously transmitting different data to several users using the same frequency band may obtain higher frequency efficiency as compared with the SU-MIMO scheme due to a multi-user diversity gain and a spacial multiplexing gain.

In the MU-MIMO scheme, electronic apparatuses that simultaneously transmit different data are determined and grouped into the same group, and the different data are simultaneously transmitted to the electronic apparatuses belonging to the group. Therefore, in the MU-MIMO scheme, performance depends on how the group is configured.

Conventionally, the electronic apparatuses belonging to the same group have been randomly selected. However, in this case, a problem that the data rate is significantly decreased may occur. Therefore, it is advantageous to find a method for configuring an optimal group.

SUMMARY

Accordingly, an aspect of the present disclosure provides a transceiver which is capable of receiving an evaluation value for belonging to the same group as the corresponding electronic apparatus from electronic apparatuses, selecting an electronic apparatus to belong to the same group based on the received evaluation value, and transmitting data and a data transmitting method thereof.

In accordance with an aspect of the present disclosure, a transceiver is provided which includes a communicator connected to a plurality of electronic apparatuses which receives channel information on a channel between a first electronic apparatus and the transceiver from the first electronic apparatus selected among the plurality of electronic apparatuses, and a controller configured to select a second electronic apparatus among the plurality of electronic apparatuses based on information received from each of the electronic apparatuses among the plurality of electronic apparatuses when the information indicating communication performance in the case in which each of the one or more electronic apparatuses is grouped in the same group as a group in which the first electronic apparatus is grouped is received from each of the electronic apparatuses among the plurality of electronic apparatuses through the communicator, group the first and second electronic apparatuses into the same group when channel information on a channel between the second electronic apparatus and the transceiver is received from the second electronic apparatus, and control the communicator to transmit data to the first and second electronic apparatuses belonging to the same group based on the channel information received from the first and second electronic apparatuses.

In accordance with another aspect of the present disclosure, a data transmission method of a transceiver is provided which includes receiving channel information between a first electronic apparatus and the transceiver from the first electronic apparatus selected among a plurality of electronic apparatuses connected to the transceiver, receiving information indicating communication performance in the case in which each of one or more electronic apparatuses is grouped into the same group as a group in which the first electronic apparatus is grouped from each of the one or more of the plurality of electronic apparatuses, selecting a second electronic apparatus among the plurality of electronic apparatuses based on the information received from each of the electronic apparatuses among the plurality of electronic devices and receiving channel information between the second electronic apparatus and the transceiver from the second electronic apparatus, and grouping the first and second electronic apparatuses into the same group and transmitting data to the first and second electronic apparatuses belonging to the same group based on the channel information received from the first and second electronic apparatuses.

BRIEF DESCRIPTION OF THE DRAWINGS

The above and other aspects, features, and advantages of the present disclosure will be more apparent to those skilled in the art from the following description when taken in conjunction with the accompanying drawings, in which:

FIG. 8 is a flow chart describing a data transmission method, according to an embodiment of the present disclosure.

DETAILED DESCRIPTION

Figure 1:
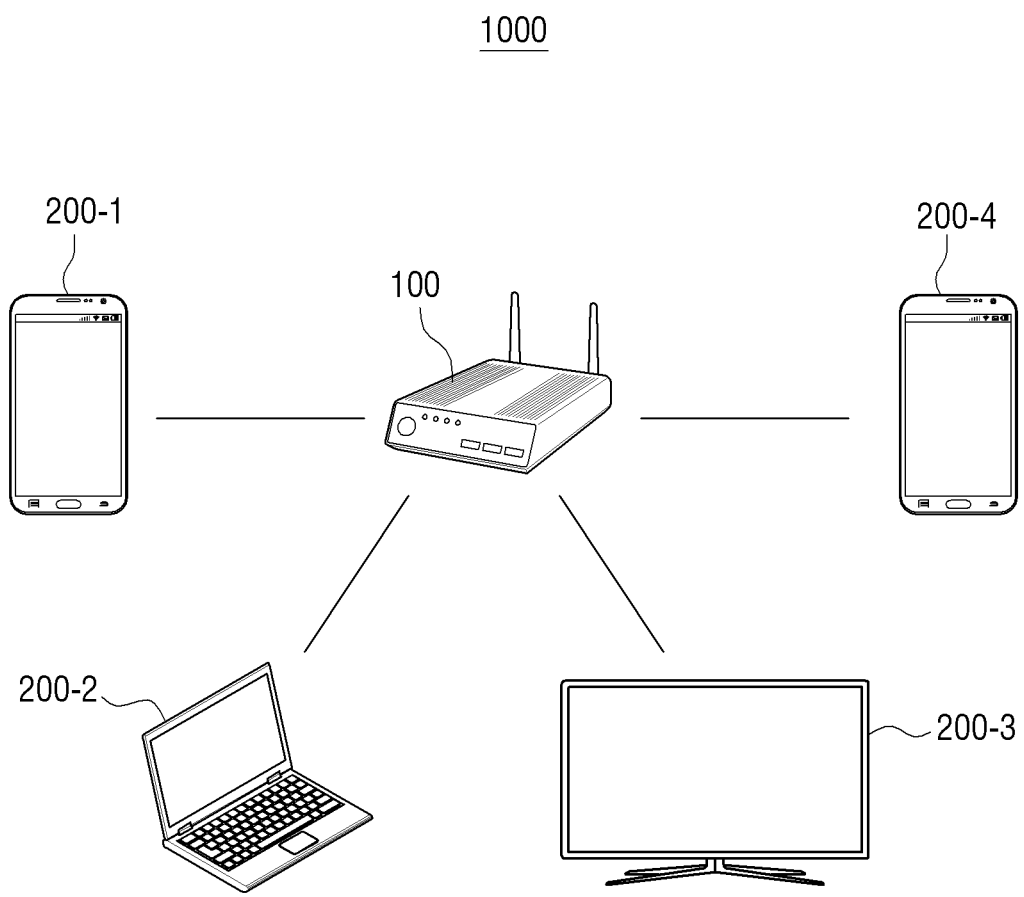
FIG. 1 illustrates a communication system, according to an embodiment of the present disclosure.

The terms used in the present disclosure are only used to describe the certain embodiments, but do not limit the scope of the disclosure. The singular expression also includes the plural meaning as long as it does conflict with the meaning in context. In the present disclosure, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In an embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor.

Hereinafter, the present disclosure will be described in detail with reference to the accompanying drawings in which similar reference numerals may refer to similar elements.

FIG. 1 illustrates a communication system, according to an embodiment of the present disclosure.

Referring to FIG. 1, the communication system 1000 includes a transceiver 100 and a plurality of electronic apparatuses 200-1, 200-2, 200-3, and 200-4.

The transceiver 100 may be an access point (AP). The electronic apparatuses 200-1, 200-2, 200-3, and 200-4, which are stations, may be implemented by various types of electronic apparatuses that may be connected to the AP, such as a mobile phone, a tablet personal computer, a computer, a laptop computer, and the like.

The electronic apparatuses 200-1, 200-2, 200-3, and 200-4 may be connected to the transceiver 100 to access a network through the transceiver 100.

The transceiver 100 may be a wireless fidelity (WiFi) AP, and the electronic apparatuses 200-1, 200-2, 200-3, and 200-4 may be connected to the transceiver 100 depending on a WiFi communication scheme to access a network such as the Internet, and the like, through the transceiver 100.

The electronic apparatuses 200-1, 200-2, 200-3, and 200-4 may access the network through the transceiver 100, and the transceiver 100 may receive data from the network and transmit the received data to electronic apparatuses 200-1, 200-2, . . . , 200-n.

The transceiver 100 and the electronic apparatuses 200-1, 200-2, 200-3, and 200-4 may be connected to each other depending on various communication schemes.

Although a case in which four electronic apparatuses 200-1, 200-2, 200-3, and 200-4 are connected to the transceiver 100 has been illustrated in FIG. 1, this is only an example, and more than or less than the four electronic apparatuses may be connected to the transceiver 100 to configure the communication system 1000.

The transceiver 100 may transmit data to the electronic apparatuses 200-1, 200-2, 200-3, and 200-4 using a multi user multiple input multiple output (MU-MIMO) scheme.

The transceiver 100 may include two or more transmit (Tx) antennas, and form channels with the electronic apparatuses in each of the transmit (Tx) antennas to simultaneously transmit different data to two or more of a plurality of electronic apparatuses 200-1, 200-2, 200-3, and 200-4 connected to the transceiver 100.

The number of electronic apparatuses to which the transceiver 100 may simultaneously transmit the data may be determined on the basis of the number of antennas provided in the transceiver 100. For example, in the case in which two transmit (Tx) antennas are provided in the transceiver 100, the transceiver 100 may simultaneously transmit different data to two electronic apparatuses 200-1 and 200-2.

The transceiver 100 may determine electronic apparatuses to which the transceiver 100 is to simultaneously transmit data among the plurality of electronic apparatuses 200-1, 200-2, 200-3, and 200-4 connected to the transceiver 100, group the determined electronic apparatuses into the same group, and simultaneously transmit the data to the electronic apparatuses belonging to the corresponding group.

The transceiver 100 may group at least two electronic apparatuses of which interference between channels is low into the same group even though the transceiver 100 does not receive channel state information (CSI) (hereinafter, referred to as channel information) indicating the states of channels formed between the transceiver 100 and the electronic apparatuses from all the electronic apparatuses connected to the transceiver 100.

The transceiver 100 may simultaneously transmit data to two or more electronic apparatuses at a faster data rate while decreasing the overhead required for obtaining the channel information.

Figure 2:
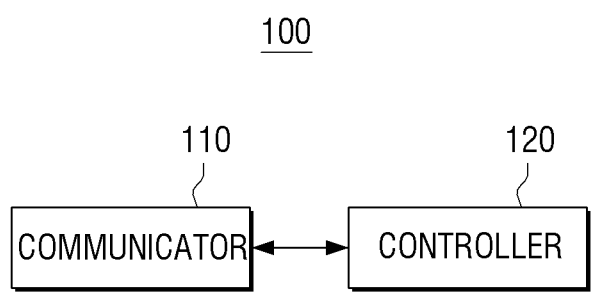
FIG. 2 is a block diagram of a transceiver, according to an embodiment of the present disclosure.

FIG. 2 is a block diagram of a transceiver, according to an embodiment of the present disclosure.

Referring to FIG. 2, the transceiver 100 includes a communicator 110 and a controller 120.

For example, the communicator 110 may be connected to the plurality of electronic apparatuses to perform communication with the plurality of electronic apparatuses. For example, the communicator 110 may include various components (for example, a WiFi chip, and the like) for WiFi communication to be connected to the plurality of electronic apparatuses depending on a WiFi communication scheme. However, the communicator 110 may be connected to the plurality of electronic apparatuses depending on various wireless communication schemes.

The transceiver 100 may access a network, and receive data from the network.

In this case, the communicator 110 may transmit the data received from the network to the plurality of electronic apparatuses.

The communicator 110 may include a plurality of transmit (Tx) antennas to simultaneously transmit the data obtained from the network to two or more of the plurality of electronic apparatuses depending on the MU-MIMO scheme. The communicator 110 may form channels with the electronic apparatuses in each of the transmit (Tx) antennas, and simultaneously transmit the data obtained from the network to two or more of the plurality of electronic apparatuses connected to the communicator 100.

The controller 120 controls operation of the transceiver 100. The controller 120 may include hardware components such as a processor or a central processing unit (CPU), a memory, a data bus, and the like, and software components such as an operating system and an application for executing a specific function.

The controller 120 may control the communicator 110 to receive channel information between a first electronic apparatus and the transceiver 100 from the first electronic apparatus selected among the plurality of electronic apparatuses.

In this case, the first electronic apparatus may be randomly selected among the plurality of electronic apparatuses connected to the transceiver 100.

The controller 120 may randomly select one electronic apparatus among the plurality of electronic apparatuses connected to the transceiver 100, and control the communicator 110 to receive channel information between the randomly selected electronic apparatus and the transceiver 100 from the randomly selected electronic apparatus.

However, although a case in which the electronic apparatus is randomly selected has been described in the example above, this is only an example. The controller 120 may also select an electronic apparatus based on the past channel state history, and select an electronic apparatus depending on various schemes.

The channel information, which is channel state information indicating a state of a channel formed between the electronic apparatus and the transceiver 100, may be represented by a magnitude and a phase.

In this case, the electronic apparatus may receive a reference signal that is known by both the electronic apparatus and the transceiver 100 from the transceiver 100, and estimate the state of the channel using the received reference signal to obtain the channel information between the electronic apparatus and the transceiver 100.

The controller 120 may request the randomly selected electronic apparatus to transmit the channel information through the communicator 110 to receive the channel information from the electronic apparatus.

As described above, the controller 120 may randomly select the first electronic apparatus among the plurality of electronic apparatuses, and receive the channel information regarding the channel state between the first electronic apparatus and the transceiver from the first electronic apparatus through the communicator 110.

Figure 3:
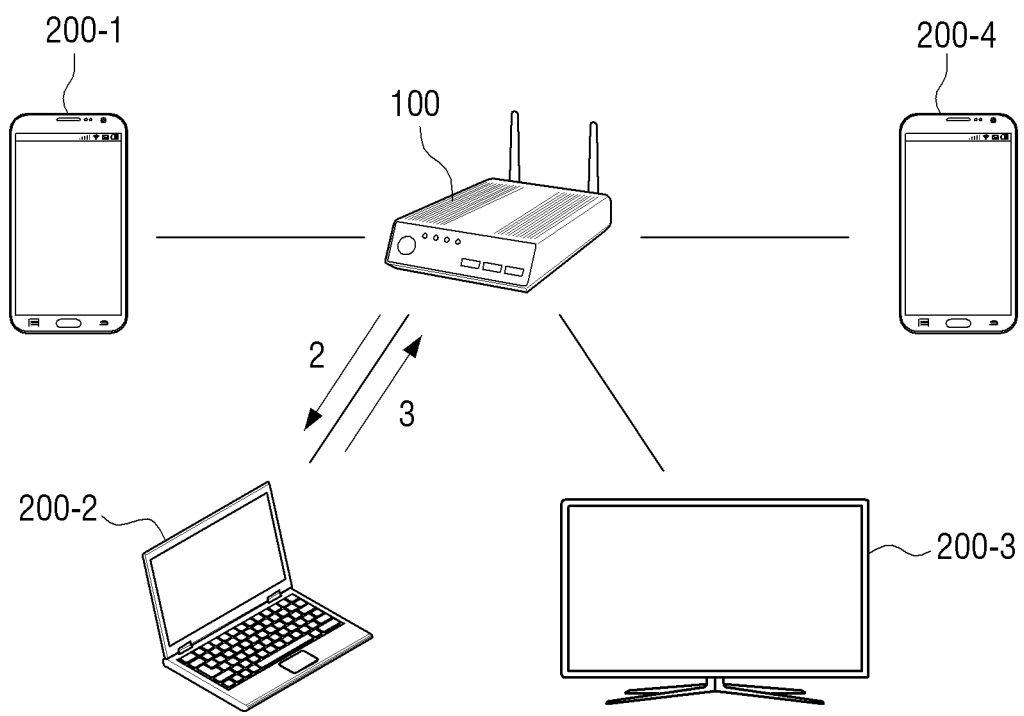
FIG. 3 illustrates a data transmission method, according to an embodiment of the present disclosure.

FIG. 3 illustrates a data transmission method, according to an embodiment of the present disclosure.

Referring to FIGS. 2 and 3, the controller 120 may randomly select one electronic apparatus, for example, the electronic apparatus 200-2 among the plurality of electronic apparatuses 200-1, 200-2, 200-3, and 200-4 connected to the transceiver 100, and request 2 the electronic apparatus 200-2 to transmit channel information. In response, the electronic apparatus 200-2 may transmit 3 the channel information between the electronic apparatus 200-2 and the transceiver 100 to the transceiver.

The controller 120 may control the communicator 110 to receive information indicating communication performance in the case in which each of one or more electronic apparatuses is grouped into the same group in which the first electronic apparatus is grouped, from each of one or more of the plurality of electronic apparatuses.

Each of one or more electronic apparatuses may receive the channel information transmitted to the transceiver 100 by the first electronic apparatus.

In the case in which the first electronic apparatus transmits the channel information to the transceiver 100, at least one electronic apparatus in the vicinity of the first electronic apparatus among the plurality of electronic apparatuses may also receive the channel information transmitted to the transceiver 100 by the first electronic apparatus.

In this case, at least one electronic apparatus may determine the communication performance on the basis of the channel information between the first electronic apparatus and the transceiver and channel information between each of the electronic apparatuses and the transceiver, and transmit the information indicating the communication performance to the transceiver 100.

The communication performance indicates whether it is appropriate that the electronic apparatus receiving the channel information transmitted to the transceiver 100 by the first electronic apparatus is grouped into the same group in which the first electronic apparatus is grouped, and the electronic apparatus may quantitatively evaluate the communication performance.

When the electronic apparatus receiving the channel information transmitted to the transceiver 100 by the first electronic apparatus is grouped into the same group in which the first electronic apparatus is grouped, the electronic apparatus and the first electronic apparatus simultaneously receive data from the transceiver 100 through different channels formed between the electronic apparatus and the first electronic apparatus and the transceiver 100.

As interference between a channel formed between the first electronic apparatus and the transceiver 100 and a channel formed between the electronic apparatus receiving the channel information transmitted by the first electronic apparatus and the transceiver 100 increases, the data rate of the transceiver 100 decreases, and thus, it may be inappropriate that the electronic apparatus is grouped into the same group in which the first electronic apparatus is grouped.

As interference between the channel formed between the first electronic apparatus and the transceiver 100 and the channel formed between the electronic apparatus receiving the channel information transmitted by the first electronic apparatus and the transceiver 100 decreases, the data rate of the transceiver 100 increases, and thus, it may be appropriate that the electronic apparatus is grouped into the same group in which the first electronic apparatus is grouped.

Each of one or more electronic apparatuses receiving the channel information transmitted to the transceiver 100 by the first electronic apparatus may determine communication performance in the case in which the electronic apparatus is grouped into the same group in which the first electronic apparatus is grouped on the basis of the channel formed between the electronic apparatus and the transceiver 100 and the channel formed between the first electronic apparatus and the transceiver 100, and may determine that the communication performance is a quantitative value.

The electronic apparatus receiving the channel information transmitted to the transceiver 100 by the first electronic apparatus may estimate the state of the channel using the reference signal received from the transceiver 100 to obtain the channel information between the electronic apparatus and the transceiver 100.

The electronic apparatus receiving the channel information transmitted to the transceiver 100 by the first electronic apparatus may determine that the communication performance is a quantified value through various schemes.

The electronic apparatus may determine that the communication performance is the quantified value on the basis of a magnitude of the channel formed between the electronic apparatus and the transceiver 100 and a magnitude of the channel formed between the first electronic apparatus and the transceiver 100.

The electronic apparatus may quantify the communication performance by comparing a relatively larger value when a difference between the magnitude of the channel formed between the electronic apparatus and the transceiver 100 and the magnitude of the channel formed between the first electronic apparatus and the transceiver 100 is large, and quantify the communication performance by comparing a relatively smaller value when the difference is small.

As another example, the electronic apparatus may quantify the communication performance by comparing a relatively larger value when a phase difference between the channel formed between the electronic apparatus and the transceiver 100 and the channel formed between the first electronic apparatus and the transceiver 100 and ±90° is small, and quantify the communication performance by comparing a relatively smaller value when the difference between the phase difference and ±90° is large.

As still another example, the electronic apparatus may quantify the communication performance on the basis of a capacity gain.

To this end, the electronic apparatus may calculate a capacity gain on the basis of Equation (1):

$$C(S) = \max_{P_j : \Sigma_{j \in S} \gamma_j^{-1} P_j \leq P} \sum_{j \in S} \log(1 + P_j). \quad (1)$$

where, $$\gamma_j = \frac{1}{\|w_j\|^2}$$

is a j-th user in a group S. In the case in which the transceiver 100 selects the first electronic apparatus, a user belonging to a group is the first electronic apparatus, and in the case in which the electronic apparatus belongs together with the first electronic apparatus in the group, a first user belonging to the group may be the first electronic apparatus and a second user may be the electronic apparatus.

In addition, $w_j$, which is a beamforming weight, is an element of a pre-coding matrix, and $P_j$ is a received power intensity of the j-th user.

Since a method for calculating a capacity through Equation (1) above is known, a detailed description thereof will be omitted.

The electronic apparatus may calculate a capacity gain for the channel between the transceiver 100 and the first electronic apparatus. In this case, the electronic apparatus may calculate a capacity $C_1(S)$ using the channel information between the transceiver 100 and the first electronic apparatus.

The electronic apparatus may calculate capacities for the channel between the transceiver 100 and the first electronic apparatus and the channel between the transceiver 100 and the electronic apparatus when it belongs to the same group to which the first electronic apparatus belongs. In this case, the electronic apparatus may calculate a capacity $C_2(S)$ using the channel information between the transceiver 100 and the first electronic apparatus and the channel information between the transceiver 100 and the electronic apparatus.

The electronic apparatus may calculate a capacity gain $C_2(S)/C_1(S)$ using the calculated capacities, and determine that the calculated capacity gain value is the quantified communication performance.

As described above, the electronic apparatus receiving the channel information transmitted to the transceiver 100 by the first electronic apparatus may quantify the communication performance in various schemes.

The electronic apparatus receiving the channel information transmitted to the transceiver 100 by the first electronic apparatus may transmit the information on the communication performance to the transceiver 100 in various schemes.

In the case in which the electronic apparatus and the transceiver 100 transmit and receive data to and from each other through an orthogonal frequency division multiplexing (OFDM) symbol, the electronic apparatus may transmit the information on the communication performance to the transceiver 100 through a subcarrier in a specific position of the OFDM symbol.

Since one OFDM symbol includes a plurality of subcarriers, the electronic apparatus may insert a specific bit into a subcarrier of a position corresponding to a value indicating the quantified communication performance among the plurality of subcarriers and transmit the information on the communication performance to the transceiver 100. In this case, the OFDM symbol used for transmission of the information on the communication performance may be pre-defined between the transceiver 100 and the electronic apparatus.

For example, in the case in which the OFDM symbol includes 0-th to N−1-th subcarriers and a range for a quantified value for the communication performance is 1 to N is assumed.

In this case, when the quantified value for the communication performance is 1, the electronic apparatus may insert 1 bit into only the 0-th subcarrier of a specific OFDM symbol and insert 0 bit into the other subcarriers, and transmit the information on the communication performance to the transceiver 100.

When the quantified value for the communication performance is N/2, the electronic apparatus may insert 1 bit into only the N/2-1-th subcarrier of the specific OFDM symbol and insert 0 bit into the other subcarriers, and transmit the information on the communication performance to the transceiver 100.

In addition, when the quantified value for the communication performance is N, the electronic apparatus may insert 1 bit into only the N−1-th subcarrier of the specific OFDM symbol and insert 0 bit into the other subcarriers, and transmit the information on the communication performance to the transceiver 100.

The electronic apparatus may transmit the information on the communication performance to the transceiver 100 in various schemes.

As described above, the electronic apparatus receiving the channel information transmitted to the transceiver 100 by the first electronic apparatus may determine the communication performance and transmit the information on the communication performance to the transceiver 100.

Figure 4:
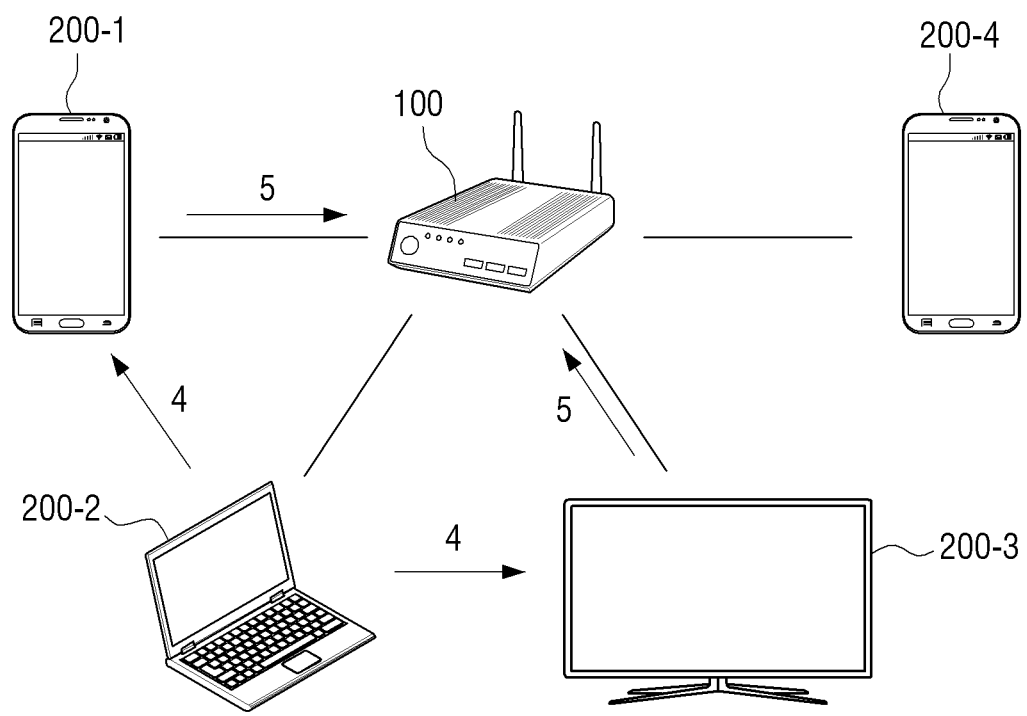
FIG. 4 illustrates a data transmission method, according to another embodiment of the present disclosure.

Referring to FIG. 4, an electronic apparatus 200-1 and an electronic apparatus 200-3 receive channel information 4 transmitted to a transceiver 100 by a first electronic apparatus 200-2. In this case, each of the electronic apparatus 200-1 and the electronic apparatus 200-3 may determine communication performance and transmit information 5 on the communication performance to the transceiver 100.

The controller 120 may select a second electronic apparatus on the basis of the information on the communication performance received from each of the electronic apparatuses.

The controller 120 may select an electronic apparatus having the highest communication performance in the case in which the electronic apparatus is grouped into the same group in which the first electronic apparatus is grouped, of one or more electronic apparatuses, as the second electronic apparatus on the basis of the information indicating the communication performance, received from each of one or more electronic apparatuses.

The controller 120 may select an electronic apparatus transmitting a value indicating the highest communication performance, of one or more electronic apparatuses, as the second electronic apparatus.

When the second electronic apparatus is selected, the controller 120 may control the communicator 110 to broadcast the information indicating the communication performance, transmitted by the second electronic apparatus.

The controller 120 may broadcast the information indicating the communication performance, transmitted by the second electronic apparatus through the same scheme as a scheme used by the electronic apparatus selected as the second electronic apparatus in order to transmit the information on the communication performance.

In this case, the second electronic apparatus may transmit channel information between the second electronic apparatus and the transceiver 100 to the transceiver 100 in the case in which the information indicating the communication performance, received from the transceiver 100 is matched to the information indicating the communication performance, transmitted to the transceiver by the second electronic apparatus.

Figure 5:
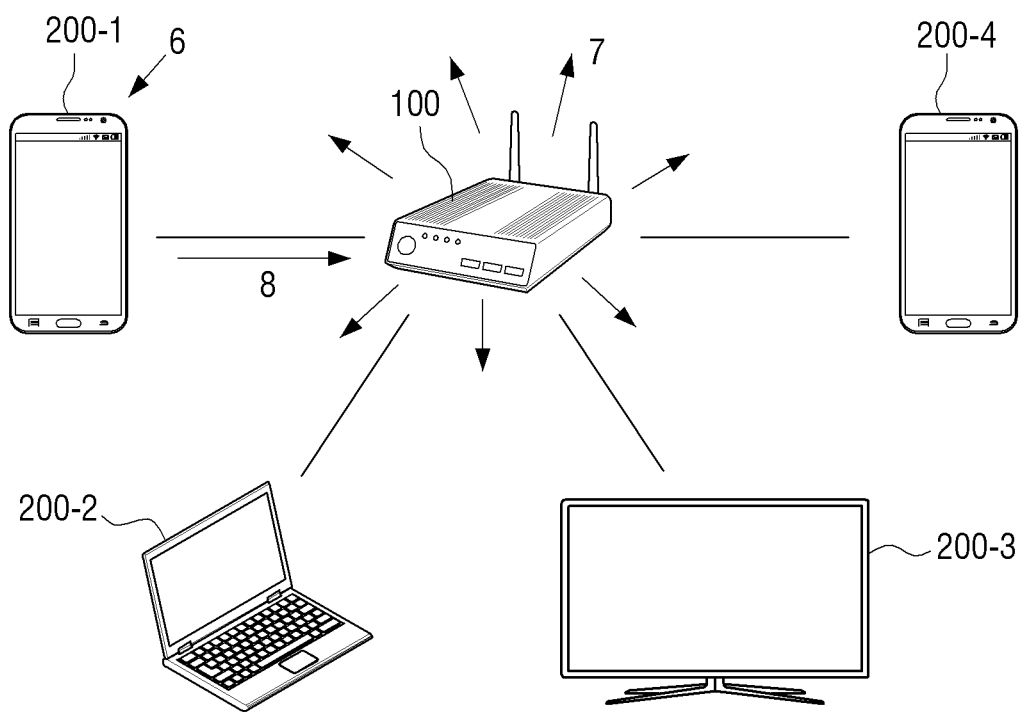
FIG. 5 illustrates a data transmission method, according to another embodiment of the present disclosure.

FIG. 5 illustrates a data transmission method, according to an embodiment of the present disclosure.

For example, as illustrated in FIG. 5, the electronic apparatus 200-1 quantifies the communication performance as N, inserts 1 bit into an N−1-th subcarrier, and transmits the information on the communication performance to the transceiver 100, and the electronic apparatus 200-3 quantifies the communication performance as N/2, inserts 1 bit into an N/2−1-th subcarrier, and transmits the information on the communication performance to the transceiver 100.

In this case, the transceiver 100 may select the electronic apparatus 200-1 transmitting a relatively larger value 6.

The transceiver 100 may insert 1 bit into an N−1-th subcarrier of a specific OFDM symbol, insert 0 bit into the other subcarriers, and broadcast the OFDM symbol 7.

In the case in which the electronic apparatus 200-1 receives the OFDM symbol including the N−1-th subcarrier into which 1 bit is inserted and the other subcarriers into which 0 bit is inserted, the electronic apparatus 200-1 may determine that the information on the communication performance received from the transceiver 100 is matched to the information on the communication performance transmitted to the transceiver 100 by the electronic apparatus 200-1.

In this case, the electronic apparatus 200-1 may transmit the information on the channel 8 formed between the electronic apparatus 200-1 and the transceiver 100 to the transceiver 100.

Although a case in which the transceiver 100 broadcasts the information indicating the communication performance, transmitted by the second electronic apparatus in the same scheme as a scheme in which the second electronic apparatus transmits the information indicating the communication performance has been described above, the present disclosure is not limited to such.

The controller 120 may also request the second electronic apparatus to transmit the channel information through the communicator 110 to receive the channel information between the second electronic apparatus and the transceiver 100 from the second electronic apparatus, and may receive the channel information from the second electronic apparatus through various schemes.

When the channel information between the second electronic apparatus and the transceiver is received from the second electronic apparatus, the controller 120 may group the first and second electronic apparatuses into the same group, and control the communicator 110 to transmit data to the first and second electronic apparatuses belonging to the same group on the basis of the channel information received from the first and second electronic apparatuses.

The controller 120 may group the first and second electronic apparatuses into the same group depending on the MU-MIMO scheme, and control the communicator 110 to simultaneously transmit data obtained from the network to the first and second electronic apparatuses.

In this case, the controller 120 may perform beamforming on signals transmitted by each of the transmit (Tx) antennas on the basis of the channel information received from each of the electronic apparatuses.

In the above-mentioned example, the transceiver 100 groups only the first and second electronic apparatuses into the same group on the assumption that two transmit (Tx) antennas are provided in the transceiver 100.

In the case in which two or more transmit (Tx) antennas are provided in the transceiver 100, the controller 120 may repeat the processes described above to determine electronic apparatuses grouped into the same group in which the first and second electronic apparatuses are grouped and simultaneously transmit data to the electronic apparatuses in the same group.

In this case, when information on communication performance is received from each of one or more electronic apparatuses receiving the channel information transmitted to the transceiver 100 by the second electronic apparatus, the controller 120 may determine an electronic apparatus grouped into the same group in which the first and second electronic apparatuses are grouped among one or more electronic apparatuses receiving the channel information transmitted to the transceiver 100 by the second electronic apparatus on the basis of the received information on the communication performance.

Figure 6:
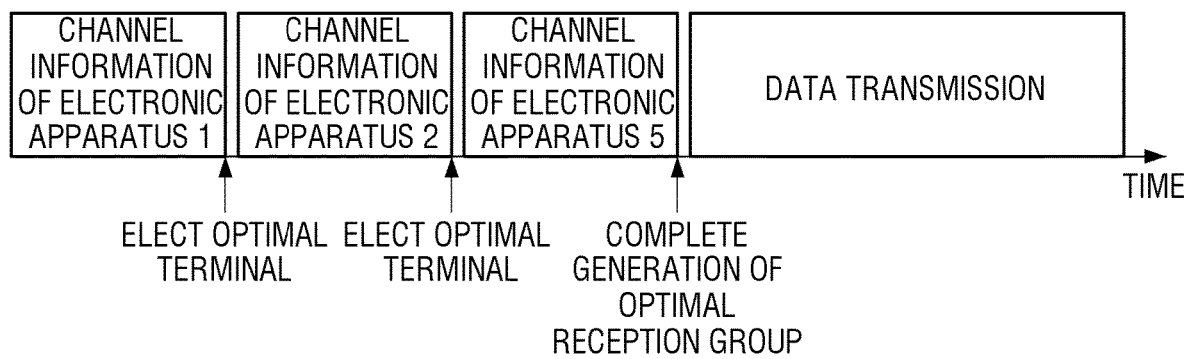
FIG. 6 illustrates a group forming method, according to an embodiment of the present disclosure.

FIG. 6 illustrates a group forming method, according to an embodiment of the present disclosure.

Referring to FIG. 6, the transceiver 100 includes three transmit (Tx) antennas to simultaneously transmit different data to three electronic apparatuses depending on the MU-MIMO scheme.

The transceiver 100 may randomly select one electronic apparatus, that is, electronic apparatus 1 among a plurality of electronic apparatuses connected to the transceiver 100, and receive channel information on the channel between electronic apparatus 1 and the transceiver 100 from electronic apparatus 1.

The transceiver 100 may determine that electronic apparatus 2 is an electronic apparatus to be grouped into the same group in which electronic apparatus 1 is grouped among one or more electronic apparatuses on the basis of information on communication performance received from each of one or more electronic apparatuses receiving the channel information transmitted from electronic apparatus 1.

The transceiver 100 may receive channel information on the channel between electronic apparatus 2 and the transceiver 100 from electronic apparatus 2.

The transceiver 100 may determine that electronic apparatus 5 is an electronic apparatus to be grouped into the same group in which electronic apparatus 2 is grouped among one or more electronic apparatuses on the basis of information on communication performance received from each of one or more electronic apparatuses receiving the channel information transmitted from electronic apparatus 2.

The transceiver 100 may receive channel information on the channel between electronic apparatus 5 and the transceiver 100 from electronic apparatus 5.

As a result, the transceiver 100 may group electronic apparatuses 1, 2, and 5 into the same group, and simultaneously transmit data to electronic apparatuses 1, 2, and 5.

Figure 7:
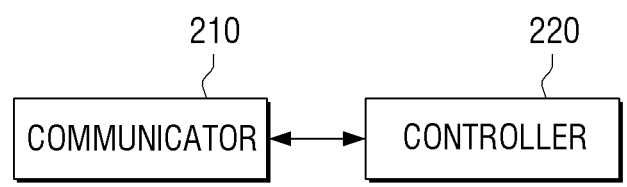
FIG. 7 is a block diagram of an electronic apparatus, according to an embodiment of the present disclosure.

FIG. 7 is a block diagram of an electronic apparatus, according to an embodiment of the present disclosure.

Referring to FIG. 7, the electronic apparatus 200 includes a communicator 210 and a controller 220.

The communicator 210 may be connected to the transceiver 100 to perform communication with the transceiver 100. For example, the communicator 210 may include various components (for example, a WiFi chip, and the like) for WiFi communication to be connected to the transceiver 100 depending on a WiFi communication scheme. However, the present disclosure is not limited to such, and the communicator 210 may be connected to the transceiver 100 depending on various wireless communication schemes.

In this case, the communicator 210 may access a network through the transceiver 100, and receive data obtained from the network from the transceiver 100.

The communicator 210 may receive channel information transmitted to the transceiver 100 by another electronic apparatus connected to the transceiver 100.

In the case in which the electronic apparatus 200 is in the vicinity of another electronic apparatus transmitting the channel information to the transceiver 100, the communicator 210 may receive the channel information transmitted to the transceiver 100 by another electronic apparatus.

The controller 220 controls operation of the electronic apparatus 200. The controller 220 may include hardware components such as a processor, a CPU, a memory, a data bus, and the like, and software components such as an operating system and an application for executing a specific function.

The controller 220 may obtain channel information between the electronic apparatus 200 and the transceiver 100.

When a reference signal is received from the transceiver 100 through the communicator 210, the controller 220 may estimate a state of a channel using the received reference signal to obtain the channel information between the electronic apparatus 200 and the transceiver 100.

The controller 220 may control the communicator 210 to transmit the channel information between the electronic apparatus 200 and the transceiver 100 to the transceiver 100 depending on a request of the transceiver 100.

In the case in which the channel information transmitted to the transceiver 100 by another electronic apparatus connected to the transceiver 100 is received, the controller 220 may determine communication performance on the basis of the channel information between the electronic apparatus 200 and the transceiver 100 and the channel information between another electronic apparatus and the transceiver 100, and transmit information indicating the communication performance to the transceiver 100.

The communication performance indicates whether it is appropriate that another electronic apparatus transmitting the channel information to the transceiver 100 and the electronic apparatus 200 are grouped into the same group, and the controller 220 may quantitatively evaluate the communication performance.

The controller 220 may determine that the communication performance is a quantified value on the basis of a magnitude of a channel formed between the electronic apparatus 200 and the transceiver 100 and a magnitude of a channel formed between another electronic apparatus and the transceiver 100.

The controller 220 may quantify the communication performance by comparing a relatively larger value when a difference between the magnitude of the channel formed between the electronic apparatus 200 and the transceiver 100 and the magnitude of the channel formed between another electronic apparatus and the transceiver 100 is large, and quantify the communication performance by comparing a relatively smaller value when the difference is small.

As another example, the controller 220 may quantify the communication performance by comparing a relatively larger value when a phase difference between the channel formed between the electronic apparatus 200 and the transceiver 100 and the channel formed between another electronic apparatus and the transceiver 100 and ±90° is small, and quantify the communication performance by comparing a relatively smaller value when the difference between the phase difference and ±90° is large.

As still another example, the controller 220 may quantify the communication performance on the basis of a capacity gain.

The controller 220 may calculate capacities of the channels on the basis of Equation (1) above, and calculate the capacity gain through the calculated capacities of the channels.

The controller 220 may calculate a capacity for the channel between the transceiver 100 and another electronic apparatus. In this case, the controller 220 may calculate a capacity $C_1(S)$ using the channel information between the transceiver 100 and another electronic apparatus.

In addition, the controller 220 may calculate capacities for the channel between the transceiver 100 and another electronic apparatus and the channel between the transceiver 100 and the electronic apparatus 200 when the electronic apparatus 200 belongs to the same group to which another electronic apparatus belongs. In this case, the controller 220 may calculate a capacity $C_2(S)$ using the channel information between the transceiver 100 and another electronic apparatus and the channel information between the transceiver 100 and the electronic apparatus 200.

The controller 220 may calculate a capacity gain $C_2(S)/C_1(S)$ using the calculated capacities, and determine that the calculated capacity gain value is the quantified communication performance.

The controller 220 may determine that the communication performance is a quantified value in various schemes in which the channel information transmitted to the transceiver 100 by another electronic apparatus is received.

The controller 220 may control the communicator 210 to transmit the information on the communication performance to the transceiver 100.

The controller 220 may transmit the information on the communication performance to the transceiver 100 through a subcarrier in a specific position of an OFDM symbol.

Since one OFDM symbol includes a plurality of subcarriers, the controller 220 may insert a specific bit into a subcarrier of a position corresponding to a value indicating the quantified communication performance among the plurality of subcarriers and transmit the information on the communication performance to the transceiver 100. In this case, the OFDM symbol used for transmission of the information on the communication performance may be predefined between the transceiver 100 and the electronic apparatus.

In the case in which the OFDM symbol includes 0-th to N−1-th subcarriers, a range for a quantified value for the communication performance is 1 to N.

In this case, when the quantified value for the communication performance is 1, the controller 220 may insert 1 bit into only the 0-th subcarrier of a specific OFDM symbol and insert 0 bit into the other subcarriers, and transmit the information on the communication performance to the transceiver 100.

When the quantified value for the communication performance is N/2, the controller 220 may insert 1 bit into only the N/2-1-th subcarrier of the specific OFDM symbol and insert 0 bit into the other subcarriers, and transmit the information on the communication performance to the transceiver 100.

When the quantified value for the communication performance is N, the controller 220 may insert 1 bit into only the N−1-th subcarrier of the specific OFDM symbol and insert 0 bit into the other subcarriers, and transmit the information on the communication performance to the transceiver 100.

However, the present disclosure is not limited to such, and the controller 220 may transmit the information on the communication performance to the transceiver 100 in various schemes.

In the case in which the information on the communication performance broadcast by the transceiver 100 is received through the communicator 210, the controller 220 may determine whether information on communication performance calculated in advance is matched to the received information on the communication performance.

For example, the electronic apparatus 200 quantifies the communication performance as N, inserts 1 bit into an N−1-th subcarrier of a specific OFDM symbol, inserts 0 bit into the other subcarriers of the specific OFDM symbol, and transmits the information on the communication performance to the transceiver 100, and then receives the OFDM symbol including the N−1-th subcarrier into which 1 bit is inserted and the other subcarriers into which 0 bit is inserted from the transceiver 100.

In this case, the controller 220 may determine that the information on the communication performance received from the transceiver 100 is matched to the information on the communication performance transmitted to the transceiver 100.

In this case, the controller 220 may control the communicator 210 to transmit the channel information between the electronic apparatus 200 and the transceiver 100 to the transceiver 100.

FIG. 8 is a flow chart of a data transmission method of a transceiver, according to an embodiment of the present disclosure.

Referring to FIG. 8, in step 810, the channel information between the first electronic apparatus and the transceiver is received from the first electronic apparatus selected among the plurality of electronic apparatuses connected to the transceiver.

In step 820, the information indicating the communication performance in the case in which each of the electronic apparatuses is grouped into the same group in which the first electronic apparatus is grouped is received from each of one or more of the plurality of electronic apparatuses.

In step 830, the second electronic apparatus is selected among one or more electronic apparatuses on the basis of the information received from each of the electronic apparatuses, and the channel information between the second electronic apparatus and the transceiver is received from the second electronic apparatus.

In step 840, the first and second electronic apparatuses are grouped into the same group, and data is transmitted to the first and second electronic apparatuses belonging to the same group on the basis of the channel information received from the first and second electronic apparatuses.

Each of one or more electronic apparatuses may receive the channel information transmitted to the transceiver by the first electronic apparatus.

Each of one or more electronic apparatuses may determine the communication performance on the basis of the channel information between the first electronic apparatus and the transceiver and channel information between each of the electronic apparatuses and the transceiver, and transmit the information indicating the communication performance to the transceiver.

In a process of selecting the second electronic apparatus, an electronic apparatus having the highest communication performance in the case in which the electronic apparatus is grouped into the same group in which the first electronic apparatus is grouped, of one or more electronic apparatuses, may be selected as the second electronic apparatus on the basis of the information indicating the communication performance, received from each of one or more electronic apparatuses.

In step 810, the first electronic apparatus may be randomly selected among the plurality of electronic apparatuses, and the channel information between the first electronic apparatus and the transceiver may be received from the first electronic apparatus.

When the second electronic apparatus is selected, the information indicating the communication performance transmitted by the second electronic apparatus is broadcast, and the second electronic apparatus may transmit the channel information between the second electronic apparatus and the transceiver to the transceiver in the case in which the information indicating the communication performance, received from the transceiver is matched to the information indicating the communication performance, transmitted to the transceiver by the second electronic apparatus.

A method in which the transceiver groups the electronic apparatuses has been described above.

In an embodiment of the present disclosure, a non-transitory computer readable medium is provided in which a program sequentially performing the data transmission method of a transceiver and a control method of an electronic apparatus according to the present disclosure is stored.

The non-transitory computer readable medium is not a medium that temporarily stores data therein, such as a register, a cache, and the like, but a computer readable medium that semi-permanently stores data therein and is readable by a device. Various applications or programs described above may be stored and provided in the non-transitory computer readable medium such as a compact disk (CD), a digital versatile disk (DVD), a hard disk, a Blu-ray disk, a universal serial bus (USB), a memory card, a flash memory, a read only memory (ROM), and the like.

Although data communication buses are not illustrated in the block diagrams of the transceiver and the electronic apparatus, communication between the respective components in the transceiver and the electronic apparatus may be performed through the buses. In addition, a processor such as a central processing unit (CPU), a microprocessor, and the like, performing various steps described above may be further included in the transceiver and the electronic apparatus.

At least one of the components, elements, modules or units represented by a block as illustrated in the figures may be embodied as various hardware, software and/or firmware structures that execute respective functions described above, according to an embodiment of the present disclosure. For example, at least one of these components, elements, modules or units may use a direct circuit structure, such as a memory, a processor, a logic circuit, a look-up table, etc., that may execute the respective functions through control of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include, or may be implemented by, a processor such as a central processing unit (CPU) that performs the respective functions, a microprocessor, or the like. Two or more of the above described components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above embodiments may be implemented in algorithms that are executed on one or more processors. Furthermore, the components, elements, modules or units represented by a block or processing steps may employ any number of related art techniques for electronics configuration, signal processing and/or control, data processing and the like.

Although the embodiments of the present disclosure have been illustrated and described hereinabove, the present disclosure is not limited to the specific embodiments described above, but may be variously modified by those skilled in the art to which the present disclosure pertains without departing from the scope and spirit of the disclosure as claimed. All modifications should also be understood to fall within the scope of the present disclosure as defined by the appended claims and their equivalents.

What is claimed is:

1. A transceiver comprising:
a communicator; and
a controller configured to:
receive, through the communicator, first channel information on a first channel between a first electronic apparatus and the transceiver from the first electronic apparatus selected among a plurality of electronic apparatuses,
based on information on communication performance of each of the plurality of electronic apparatuses respectively received from each of the plurality of electronic apparatuses through the communicator, select a second electronic apparatus among the plurality of electronic apparatuses,
based on second channel information on a second channel between the second electronic apparatus and the transceiver being received from the second electronic apparatus through the communicator, group the first and second electronic apparatuses into a group, and
control the communicator to transmit data to the first and second electronic apparatuses belonging to the group based on the first channel information and the second channel information, wherein the information on the communication performance is determined by each of the plurality of electronic apparatuses based on an interference between the first channel corresponding to the first channel information and each of a plurality of channels, respectively,
wherein each of the plurality of channels is a channel between the transceiver and each of the plurality of electronic apparatuses, respectively, and
wherein each of the plurality of electronic apparatuses receives the first channel information transmitted to the transceiver by the first electronic apparatus.

2. The transceiver of claim 1, wherein the plurality of electronic apparatuses determine the communication performance based on the first channel information and third channel information on a channel between each of the plurality of electronic apparatuses and the transceiver, and respectively transmit information on the communication performance to the transceiver.

3. The transceiver of claim 2, wherein the controller is further configured to select as the second electronic apparatus, an electronic apparatus with a highest communication performance in the case in which the electronic apparatus is in the same group as the first electronic apparatus, based on the information on the communication performance respectively being received from the plurality of electronic apparatuses.

4. The transceiver of claim 1, wherein the controller is further configured to randomly select the first electronic apparatus among the plurality of electronic apparatuses, and receive the first channel information from the first electronic apparatus through the communicator.

5. The transceiver of claim 1, wherein the controller is further configured to control the communicator to broadcast information on a communication performance of the second electronic apparatus among the information on the communication performance, when the second electronic apparatus is selected, and
the second electronic apparatus transmits the second channel information to the transceiver in the case in which the information on the communication performance, received from the transceiver, is matched to information on the communication performance, transmitted to the transceiver by the second electronic apparatus.

6. A method of a transceiver, comprising:
receiving first channel information on a first channel between a first electronic apparatus and the transceiver from the first electronic apparatus selected among a plurality of electronic apparatuses connected to the transceiver;
receiving information on communication performance of each of the plurality of electronic apparatuses from each of the plurality of electronic apparatuses, respectively;
selecting a second electronic apparatus among the plurality of electronic apparatuses based on the information on communication performance of each of the plurality of electronic apparatuses;
receiving second channel information on a second channel between the second electronic apparatus and the transceiver from the second electronic apparatus;
grouping the first and second electronic apparatuses into the same group based on the second channel information; and transmitting data to the first and second electronic apparatuses belonging to the same group based on the first channel information and the second channel information, wherein the information on the communication performance is determined by each of the plurality of electronic apparatuses based on an interference between the first channel corresponding to the first channel information and each of a plurality of channels, respectively, wherein each of the plurality of channels is a channel between the transceiver and each of the plurality of electronic apparatuses, respectively and wherein each of the plurality of electronic apparatuses receives the first channel information transmitted to the transceiver by the first electronic apparatus.

7. The method of claim 6, wherein the plurality of electronic apparatuses determine the communication performance based on the first channel information and third channel information on a channel between each of the plurality of electronic apparatuses and the transceiver, and respectively transmit the information on the communication performance to the transceiver.

8. The method of claim 7, wherein selecting the second electronic apparatus comprises selecting, as the second electronic apparatus, an electronic apparatus with a highest communication performance in the case in which the electronic apparatus is grouped in the same group in which the first electronic apparatus is grouped, based on the information on the communication performance respectively being received from the plurality of electronic apparatuses.

9. The method of claim 6, wherein receiving the first channel information comprises:
randomly selecting the first electronic apparatus among the plurality of electronic apparatuses, and
receiving the first channel information from the first electronic apparatus.

10. The method of claim 6, further comprising broadcasting information on a communication performance of the second electronic apparatus among the information on the communication performance, when the second electronic apparatus is selected, wherein the second electronic apparatus transmits the second channel information to the transceiver in the case in which the information on the communication performance, received from the transceiver, is matched to information on the communication performance, transmitted to the transceiver by the second electronic apparatus.

* * * * *